(12) United States Patent
Maaref et al.

(10) Patent No.: US 10,536,386 B2
(45) Date of Patent: Jan. 14, 2020

(54) SYSTEM AND METHOD FOR DYNAMIC RESOURCE ALLOCATION OVER LICENSED AND UNLICENSED SPECTRUMS

(71) Applicant: Huawei Technologies Co., Ltd., Shenzhen (CN)

(72) Inventors: Amine Maaref, Kanta (CA); Mohamed Adel Salem, Kanata (CA); Jianglei Ma, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/670,215

(22) Filed: Mar. 26, 2015

(65) Prior Publication Data

US 2015/0334599 A1 Nov. 19, 2015

Related U.S. Application Data

(60) Provisional application No. 61/994,734, filed on May 16, 2014.

(51) Int. Cl.
*H04L 5/00* (2006.01)
*H04W 16/14* (2009.01)
(Continued)

(52) U.S. Cl.
CPC .......... *H04L 47/263* (2013.01); *H04L 5/0041* (2013.01); *H04W 16/14* (2013.01);
(Continued)

(58) Field of Classification Search
CPC ... H04W 16/14; H04W 28/08; H04W 72/087; H04W 72/0453; H04W 74/0866; H04W 28/12; H04L 5/0041
See application file for complete search history.

(56) References Cited

U.S. PATENT DOCUMENTS 7,512,094 B1 3/2009 Linebarger et al.
7,590,093 B1 9/2009 Goyal et al.
(Continued)

FOREIGN PATENT DOCUMENTS

CN 101268707 A 9/2008
CN 101616419 A 12/2009
(Continued)

OTHER PUBLICATIONS

International Search Report and Written Opinion received in International Application No. PCT/CN2015/077813 dated Aug. 5, 2015, 10 pages.
(Continued)

*Primary Examiner* — Mohammad S Anwar
(74) *Attorney, Agent, or Firm* — Slater Matsil, LLP

(57) ABSTRACT

Dynamically varying transmission rates of a traffic flow over respective portions of a primary band and a complementary band may allow a transmit point to satisfy quality of service (QoS) requirements over a unified air interface. The QoS requirement may stipulate that an overall transmission rate of the traffic flow over the unified air interface exceeds a threshold. Transmission rates may be varied based on a contention level of the complementary band. For instance, during periods of high contention, the transmission rate on the primary band may be ramped up to compensate for a lower effective transmission rate over the complementary band. Likewise, during periods of low contention, the transmission rate on the primary band may be stepped down to compensate for a higher effective transmission rate over the complementary band.

36 Claims, 6 Drawing Sheets

(51) Int. Cl.
*H04W 28/02* (2009.01)
*H04W 28/08* (2009.01)
*H04W 28/12* (2009.01)
*H04W 28/18* (2009.01)
*H04W 72/04* (2009.01)
*H04W 72/08* (2009.01)
*H04W 72/12* (2009.01)
*H04W 74/08* (2009.01)
*H04L 12/825* (2013.01)

(52) U.S. Cl.
CPC ....... *H04W 28/0284* (2013.01); *H04W 28/08* (2013.01); *H04W 28/12* (2013.01); *H04W 28/18* (2013.01); *H04W 72/0453* (2013.01); *H04W 72/08* (2013.01); *H04W 72/087* (2013.01); *H04W 72/1278* (2013.01); *H04W 74/0866* (2013.01); *H04W 28/085* (2013.01)

(56) References Cited

U.S. PATENT DOCUMENTS

| | | | |
|---|---|---|---|
| 8,126,473 B1 * | 2/2012 | Kim | H04L 12/40045 455/422.1 |
| 8,428,038 B1 | 4/2013 | Buttles | |
| 9,264,846 B2 * | 2/2016 | Stromberg | H04L 69/18 |
| 2003/0086515 A1 | 5/2003 | Trans et al. | |
| 2004/0013089 A1 | 1/2004 | Taneja et al. | |
| 2004/0203815 A1 | 10/2004 | Shoemake et al. | |
| 2006/0056365 A1 * | 3/2006 | Das | H04L 41/12 370/338 |
| 2006/0251026 A1 | 11/2006 | Kalhan | |
| 2006/0281404 A1 | 12/2006 | Lee et al. | |
| 2007/0014536 A1 | 1/2007 | Hellman | |
| 2007/0026868 A1 | 2/2007 | Schulz et al. | |
| 2007/0099641 A1 | 5/2007 | Lastinger et al. | |
| 2007/0133482 A1 | 6/2007 | Grannan | |
| 2007/0275657 A1 | 11/2007 | Chang et al. | |
| 2008/0039089 A1 | 2/2008 | Berkman et al. | |
| 2008/0069242 A1 | 3/2008 | Xu et al. | |
| 2008/0107095 A1 | 5/2008 | Black et al. | |
| 2008/0112467 A1 | 5/2008 | Shellhammer | |
| 2008/0176518 A1 | 7/2008 | Pascht et al. | |
| 2008/0220787 A1 | 9/2008 | Stanwood et al. | |
| 2008/0298275 A1 * | 12/2008 | De Sousa | H04W 16/18 370/255 |
| 2009/0016246 A1 | 1/2009 | Battin et al. | |
| 2009/0073924 A1 | 3/2009 | Chou | |
| 2009/0088164 A1 | 4/2009 | Shen et al. | |
| 2009/0092105 A1 | 4/2009 | Chou | |
| 2009/0109921 A1 | 4/2009 | Bowen | |
| 2009/0175214 A1 | 7/2009 | Sfar et al. | |
| 2009/0258607 A1 | 10/2009 | Beninghaus et al. | |
| 2009/0282309 A1 | 11/2009 | Yue et al. | |
| 2010/0184435 A1 | 7/2010 | Shellhammer et al. | |
| 2010/0227606 A1 | 9/2010 | Nan et al. | |
| 2010/0260266 A1 | 10/2010 | Gholmieh et al. | |
| 2011/0028102 A1 | 2/2011 | Li et al. | |
| 2011/0115976 A1 | 5/2011 | Ohayon et al. | |
| 2011/0158096 A1 | 6/2011 | Leung et al. | |
| 2011/0165896 A1 | 7/2011 | Stromberg et al. | |
| 2011/0176478 A1 | 7/2011 | Inohiza | |
| 2011/0237238 A1 | 9/2011 | Hassan et al. | |
| 2011/0243060 A1 | 10/2011 | Mildh et al. | |
| 2011/0286343 A1 | 11/2011 | Powell et al. | |
| 2011/0286424 A1 | 11/2011 | Jeon et al. | |
| 2011/0305189 A1 | 12/2011 | Chen et al. | |
| 2012/0039284 A1 | 2/2012 | Barbieri et al. | |
| 2012/0077510 A1 | 3/2012 | Chen et al. | |
| 2012/0134328 A1 | 5/2012 | Gauvreau et al. | |
| 2012/0250631 A1 | 10/2012 | Hakola et al. | |
| 2012/0317300 A1 | 12/2012 | Huang et al. | |
| 2013/0016221 A1 * | 1/2013 | Charbit | H04W 16/14 348/180 |
| 2013/0023202 A1 | 1/2013 | Koskela et al. | |
| 2013/0059594 A1 | 3/2013 | Hui et al. | |
| 2013/0064198 A1 | 3/2013 | Krishnaswamy et al. | |
| 2013/0077501 A1 | 3/2013 | Krishnaswamy et al. | |
| 2013/0143541 A1 | 6/2013 | Henderson et al. | |
| 2013/0155991 A1 | 6/2013 | Kazmi et al. | |
| 2013/0156005 A1 | 6/2013 | Li et al. | |
| 2013/0165134 A1 | 6/2013 | Touag et al. | |
| 2013/0255991 A1 | 6/2013 | Snitchler et al. | |
| 2013/0176934 A1 | 7/2013 | Malladi et al. | |
| 2013/0188552 A1 | 7/2013 | Kazmi et al. | |
| 2013/0242873 A1 | 9/2013 | Ohayon et al. | |
| 2013/0244666 A1 | 9/2013 | Carmon et al. | |
| 2013/0276044 A1 | 10/2013 | Ohayon et al. | |
| 2013/0286834 A1 | 10/2013 | Lee | |
| 2013/0295946 A1 | 11/2013 | Panchal et al. | |
| 2013/0295948 A1 | 11/2013 | Ye et al. | |
| 2013/0311673 A1 | 11/2013 | Karthikeyan et al. | |
| 2013/0337821 A1 | 12/2013 | Clegg | |
| 2013/0343288 A1 | 12/2013 | Ratasuk et al. | |
| 2014/0016570 A1 | 1/2014 | Ma et al. | |
| 2014/0023022 A1 | 1/2014 | Cheng et al. | |
| 2014/0031054 A1 | 1/2014 | Zou et al. | |
| 2014/0036853 A1 | 2/2014 | Kim et al. | |
| 2014/0043979 A1 | 2/2014 | Etemad et al. | |
| 2014/0050086 A1 | 2/2014 | Himayat et al. | |
| 2014/0051467 A1 | 2/2014 | Tan et al. | |
| 2014/0092828 A1 | 4/2014 | Sirotkin | |
| 2014/0105115 A1 | 4/2014 | Ohayon et al. | |
| 2014/0120975 A1 | 5/2014 | Liu et al. | |
| 2014/0169261 A1 | 6/2014 | Ming et al. | |
| 2014/0189091 A1 | 7/2014 | Tamasi et al. | |
| 2014/0233437 A1 | 8/2014 | Abdoli et al. | |
| 2014/0233472 A1 | 8/2014 | Kadel | |
| 2014/0269550 A1 | 9/2014 | Webb | |
| 2014/0282754 A1 | 9/2014 | Rehman et al. | |
| 2014/0287769 A1 | 9/2014 | Taori et al. | |
| 2014/0294118 A1 | 10/2014 | Baik et al. | |
| 2014/0307552 A1 | 10/2014 | Elsherif et al. | |
| 2015/0009962 A1 | 1/2015 | Clegg | |
| 2015/0011226 A1 | 1/2015 | De Sousa | |
| 2015/0016318 A1 | 1/2015 | Lee et al. | |
| 2015/0067541 A1 | 3/2015 | Karande et al. | |
| 2015/0085741 A1 | 3/2015 | Sfar et al. | |
| 2015/0117468 A1 | 4/2015 | Shin et al. | |
| 2015/0131536 A1 | 5/2015 | Kaur et al. | |
| 2015/0146615 A1 | 5/2015 | Yu et al. | |
| 2015/0172931 A1 | 6/2015 | Jose et al. | |
| 2015/0188665 A1 | 7/2015 | Chen et al. | |
| 2015/0189652 A1 | 7/2015 | Mizusawa | |
| 2015/0215133 A1 | 7/2015 | Cao et al. | |
| 2015/0237628 A1 | 8/2015 | Nerella et al. | |
| 2015/0264702 A1 | 9/2015 | Yang et al. | |
| 2015/0289270 A1 | 10/2015 | Knapp et al. | |
| 2015/0304146 A1 | 10/2015 | Yang et al. | |
| 2015/0319753 A1 | 11/2015 | Chen et al. | |
| 2015/0334642 A1 | 11/2015 | Maaref et al. | |
| 2015/0334643 A1 | 11/2015 | Maaref et al. | |
| 2015/0334712 A1 | 11/2015 | Maaref et al. | |
| 2016/0112157 A1 | 4/2016 | Li et al. | |
| 2016/0135143 A1 | 5/2016 | Won et al. | |
| 2016/0285537 A1 | 9/2016 | Maaref et al. | |
| 2016/0295477 A1 | 10/2016 | Zhu | |
| 2016/0353287 A1 | 12/2016 | Hassan et al. | |
| 2017/0118758 A1 | 4/2017 | Li | |
| 2018/0199280 A1 | 7/2018 | Griot et al. | |

FOREIGN PATENT DOCUMENTS

| | | |
|---|---|---|
| CN | 101682530 A | 3/2010 |
| CN | 101743766 A | 6/2010 |
| CN | 101820632 A | 9/2010 |
| CN | 102232307 A | 11/2011 |
| CN | 102474727 A | 5/2012 |
| CN | 102907153 | 1/2013 |
| CN | 102917448 A | 2/2013 |
| CN | 103188711 A | 7/2013 |
| CN | 103327552 A | 9/2013 |
| CN | 103370896 A | 10/2013 |
| CN | 103414917 A | 11/2013 |

(56) References Cited

FOREIGN PATENT DOCUMENTS

| | | |
|---|---|---|
| CN | 103441779 A | 12/2013 |
| CN | 103532663 A | 1/2014 |
| CN | 104041174 A | 9/2014 |
| EP | 1545144 A1 | 6/2005 |
| EP | 2741547 B1 | 9/2018 |
| JP | 2009246875 A | 10/2009 |
| JP | 2010505324 A | 2/2010 |
| JP | 2012516108 A | 7/2012 |
| JP | 2013062830 A | 4/2013 |
| JP | 2013534395 A | 9/2013 |
| JP | 2014500685 A | 1/2014 |
| JP | 2014502799 A | 2/2014 |
| JP | 2014207673 A | 10/2014 |
| KR | 20090082366 A | 7/2009 |
| KR | 20130126816 A | 11/2013 |
| KR | 20140017517 A | 2/2014 |
| KR | 20140025435 A | 3/2014 |
| RU | 2414050 C2 | 3/2011 |
| RU | 2419997 C2 | 5/2011 |
| RU | 2442288 C2 | 2/2012 |
| RU | 2449483 C2 | 4/2012 |
| RU | 2012141029 A | 3/2014 |
| TN | 103583028 A | 2/2014 |
| WO | 0064106 A1 | 10/2000 |
| WO | 2010077631 A1 | 7/2010 |
| WO | 2011162983 A1 | 12/2011 |
| WO | 2012039656 A1 | 3/2012 |
| WO | 2012058823 A1 | 5/2012 |
| WO | 2012078565 A1 | 6/2012 |
| WO | 2012044801 A2 | 10/2012 |
| WO | 2012171931 A1 | 12/2012 |
| WO | WO 2012/0171931 * 12/2012 ............ H04W 72/04 | |
| WO | 2013103754 | 7/2013 |
| WO | 2013162615 A1 | 10/2013 |
| WO | 2014027496 | 2/2014 |
| WO | 2014066403 A1 | 5/2014 |
| WO | 2014070394 A1 | 5/2014 |

OTHER PUBLICATIONS

International Search Report and Written Opinion received in International Application No. PCT/CN2015/079076 dated Aug. 19, 2015, 11 pages.

International Search Report and Written Opinion received in International Application No. PCT/CN2015/078962 dated Aug. 20, 2015, 11 pages.

LTE, 3rd Generation Partnership Project; Technical Specification Group Services and System Aspects; Multimedia Broadcast/Multicase Service (MBMS); Protocols and Codecs (Release 13), 3GPP TS 26.346 v13.0.0, Mar. 2015, 207 pages.

Byers, J.W., et al., "A Digital Fountain Approach to Reliable Distribution of Bulk Data," (date unknown), 15 pages.

Kushwaha, H., et al., "Reliable Multimedia Transmission Over Cognitive Radio Networks Using Fountain Codes," Proceedings of the IEEE, vol. 96, No. 1, Jan. 2008, 11 pages.

Luby, Michael G., et al., "Efficient Erasure Correcting Codes," IEEE Transactions of Information Theory, vol. 47, No. 2, Feb. 2001, pp. 569-584.

Luby, Michael, "LT Codes," Proceedings of the 43rd Annual IEEE Symposium on Foundations of Computer Science (FOCS '02), 2002, 10 pages.

Shokrollahi, Amin, "Raptor Codes," IEEE Transactions of Information Theory, vol. 52, No. 6, Jun. 2006, pp. 2551-2567.

"New SID: Study on Licensed-Assisted Access using LTE," 3GPP TSG RAN Meeting #63, RP-140481, Fukuoka, Japan, Mar. 3-6, 2014, 8 pages.

Dikmese et al., "Spectrum sensing and resource allocation for multicarrier cognitive radio systems under interference and power constraints", EURASIP Journal of Advances in Signal Processing 2014, May 12, 2014, 12 pages.

Huawei et al., "Motiviation of the New SI Proposal: Study on Licensed-Assisted Access using LTE," 3GPP TSG RAN Meeting #63, RP-140214, Mar. 2014, 9 pages, Fukuoka, Japan.

Ericsson et al., "Study on Licensed-Assisted Access Using LTE Motivation," 3GPP TSG RAN Meeting #63, RP-140260, Mar. 2014, 8 Pages, Fukuoka, Japan.

"New SID: Study on Licensed-Assisted Access using LTE," 3GPP TSG RAN Meeting #63, RP-140240, Fukuoka, Japan, Mar. 3-6, 2014, 8 pages.

"IEEE Standard for Information technology—Telecommunications and information exchange between stystems—Local and metropolitan area networks—Specific requirements, Part 11: Wireless LAN Medium Access Control (MAC) and Physical Later (PHY) Specifications, Amendment 5 : Enhacements for Higher Throughput", IEEE Computer Society, 802.11n, Oct. 2009, 536 Pages.

"IEEE Standard for Lcoal and metroplitan area networks, Part 16: Air Interface for Broadband Wireless Access Systems", IEEE Computer Society and IEEE Microwave Theory and Techniques Society, 802.16, May 2009, 2082 Pages.

* cited by examiner

SYSTEM AND METHOD FOR DYNAMIC RESOURCE ALLOCATION OVER LICENSED AND UNLICENSED SPECTRUMS

This patent application claims priority to U.S. Provisional Application No. 61/994,734, filed on May 16, 2014 and entitled "System and Method for Integrated Licensed-Unlicensed QoS-Driven Spectrum Access," which is hereby incorporated by reference herein as if reproduced in its entirety.

TECHNICAL FIELD

The present invention relates generally to managing the allocation of resources in a network, and in particular embodiments, to techniques and mechanisms for systems and methods for dynamic resource allocation over licensed and unlicensed spectrums.

BACKGROUND

Governmental bodies reserve bands of wireless spectrum for different uses. For example, the Federal Communications Commission (FCC), the International Telecommunication Union (ITU), and other regulatory agencies reserve some portions of the spectrum for licensed activities (e.g., radio, television, satellite, mobile telecommunication, etc.), while reserving other portions of the spectrum for unlicensed activities. The licensed spectrums may be subject to regulations set forth by the regulatory agency, as well as to operating protocols agreed upon by the public and/or private entities engaging in the licensed activity. The spectrum reserved for unlicensed communications may also be subject to regulations set forth by the corresponding regulatory agency, particularly with regards to transmission power and shared access.

SUMMARY OF THE INVENTION

Technical advantages are generally achieved, by embodiments of this disclosure which describe systems and methods for dynamic resource allocation over licensed and unlicensed spectrums.

In accordance with an embodiment, a method for facilitating signal transmissions spanning licensed and unlicensed bands. In this example, the method includes identifying a traffic flow being transported over a unified air interface. The traffic flow is transported over portions of both a primary band licensed for cellular communication and a complementary band reserved for unlicensed communication. The method further includes prompting a transmit point to dynamically vary rates in which the traffic flow is transmitted over respective portions of the primary band and the complementary band such that an overall quality of service (QoS) requirement of the traffic flow over the unified air interface is satisfied. An apparatus for performing this method is also provided.

In accordance with another embodiment, a method for transmitting signals spanning licensed and unlicensed bands is provided. In this example, the method includes establishing a unified air interface between a transmit point and one or more receive points. The unified air interface is adapted to transport wireless signals over both a primary band licensed for cellular communication and a complementary band reserved for unlicensed communication. The method further includes performing a wireless transmission over the unified air interface. The wireless transmission transports a traffic flow over portions of both the primary band and the complementary band. The method further includes dynamically varying rates in which the traffic flow is transmitted over respective portions of the primary band and the complementary band such that an overall quality of service (QoS) requirement of the traffic flow over the unified air interface is satisfied. An apparatus for performing this method is also provided.

In accordance with yet another embodiment, a method for dynamically adapting a signal spanning licensed and unlicensed bands is provided. In this example, the method includes establishing a unified air interface between a transmit point and one or more receive points. The unified air interface is adapted to transport wireless signals over both a primary band licensed for cellular communication and a complementary band reserved for unlicensed communication. The method further includes performing a wireless transmission over the unified air interface. The wireless transmission transports a traffic flow over portions of both the primary band and the complementary band. The method further includes dynamically varying an amount of resources transporting the traffic flow over the complementary band in accordance with one or both of a quality of service (QoS) requirement of the traffic and a channel condition of the complementary band. An apparatus for performing this method is also provided.

In accordance with yet another embodiment, a method for receiving a signal spanning licensed and unlicensed bands is provided. In this example, the method includes establishing a unified air interface between a transmit point and one or more receive points. The unified air interface is adapted to transport wireless signals over both a primary band licensed for cellular communication and a complementary band reserved for unlicensed communication. The method further includes receiving a traffic flow over the unified air interface. The traffic flow is transported over at least a portion of the primary band and a portion of the complementary band. An amount of resources used to transport the traffic flow over the complementary band is dynamically varied in accordance with one or both of a quality of service (QoS) requirement of the traffic and a channel condition of the complementary band. An apparatus for performing this method is also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
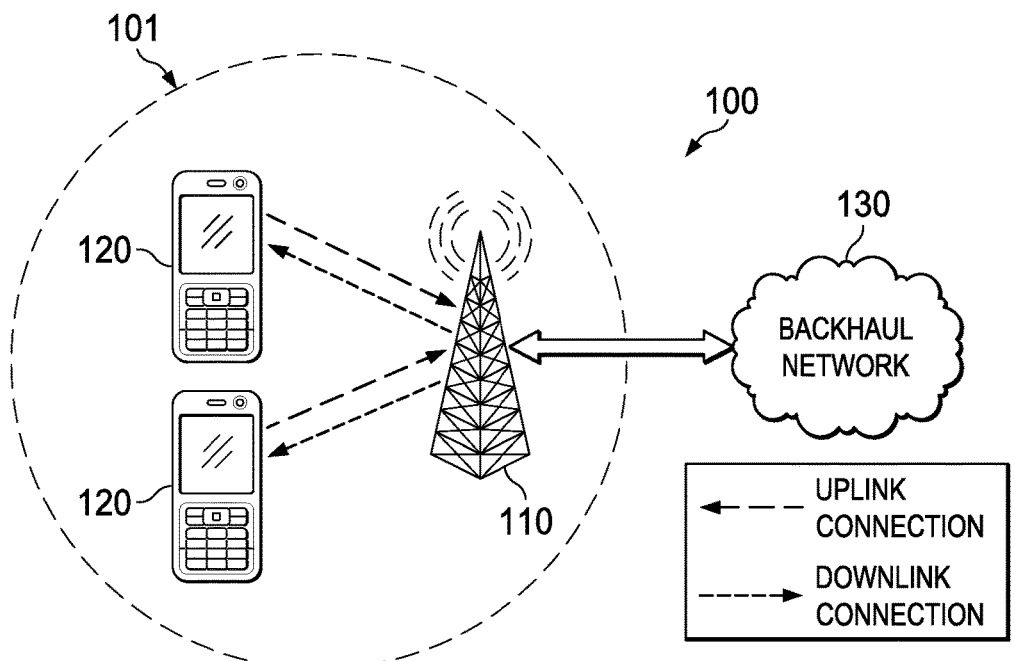
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Many wireless telecommunication protocols, such as the long term evolution (LTE) advanced (LTE-A) protocol, operate exclusively in frequency bands licensed for cellular communications, which are collectively referred to as the "primary band" throughout this disclosure. Other wireless telecommunications protocols, such as Wi-Fi protocol, operate exclusively in the unlicensed band, which is referred to as the "complementary band" throughout this disclosure. The term "licensed band" may be used interchangeably with the term "primary band," and the term "unlicensed band" may be used interchangeably with the term "complementary band." Notably, the frequency bands licensed for cellular transmission may change from time to time, and the term "primary band" refers to frequency bands that have are re-licensed for cellular transmission after the filing of this application. The complementary band may include spectrums reserved for non-telecom purposes, such as the industrial, scientific and medical (ISM) band. Telecommunication protocols operating over the primary band often provide more reliable data transmissions, while telecommunication protocols operating over the complementary band are often capable of supporting low latency high volume transmissions, albeit with reduced reliability.

A unified air interface configured to transport wireless transmissions spanning portions of both the primary and complementary bands is described in U.S. patent application Ser. No. 14/669,333, now U.S. Publication No. 2015/0334642, which is incorporated by reference herein as if reproduced in its entirety. Aspects of this disclosure provide techniques for dynamically varying transmission rates of a traffic flow over respective portions of the primary band and the complementary band such that a quality of service (QoS) requirement of the traffic flow over the unified air interface is satisfied. In some embodiments, the QoS requirement is satisfied when a cumulative transmission rate of the traffic flow over unified air interface exceeds a threshold. The cumulative transmission rate is the total/overall transmission rate over the unified air interface, which includes the summation of the transmission rate over the primary band and the transmission rate over the complementary band. For example, a transmission rate over one band may be increased by an amount that is proportional to a decrease in the transmission rate over the other band. In some embodiments, the transmission rates may be varied based on a contention level of the complementary band. For instance, during periods of high contention, the transmission rate on the primary band may be ramped up to compensate for a lower effective transmission rate over the complementary band. Likewise, during periods of low contention, the transmission rate on the primary band may be stepped down to compensate for a higher effective transmission rate over the complementary band. One way to ramp up/down the transmission rate on the primary band is to schedule more or fewer grant-based/scheduled resources to the traffic flow. In yet other embodiments, the transmission rates may be varied based on resource availability on the primary band. In some embodiments, the transmission rates may be varied by changing the amount of spectrum spanned by wireless transmission in the complementary band, the primary band, or both. For example, the amount of spectrum spanned by the complementary band may be varied by increasing or decreasing the number of grant-less resources in the complementary band that a transmit point is attempting to access using a contention-based access scheme. As another example, the amount of spectrum spanned by the primary band may be varied by increasing or decreasing the number of scheduled resources assigned to the transmit or receive point. In some embodiments, varying the amount of spanned spectrum may allow the transmit point to increase/decrease a data transmission rate over the corresponding band without affecting the other band. These and other aspects are described in greater detail below.

As used herein, the term "unified air interface" refers to an air interface sharing a common physical and medium access control (MAC) connection, as may be consistent with an interface operating in accordance with a common radio access technology (RAT), such as a cellular radio access network (RAN) in an fifth generation (5G) LTE system. In some embodiments, a unified air interface includes at least two spectrum-type dependent air interface configurations, including one air interface configuration for a primary band licensed for cellular communication, and one air interface configuration for a complementary band reserved for unlicensed communication.

FIG. 1 illustrates a network 100 for communicating data. The network 100 comprises a base station 110 having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.11a/b/g/n/ac, etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

Figure 2:
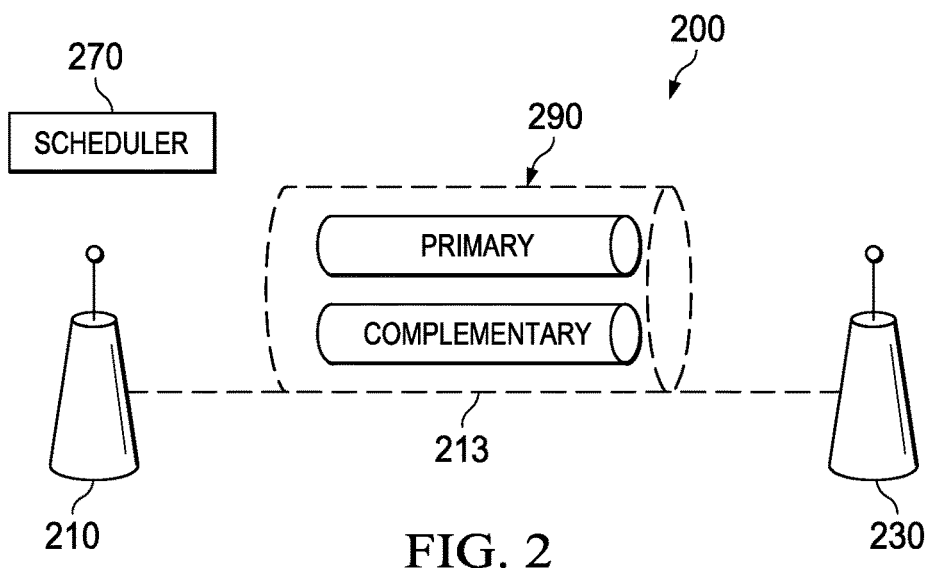
FIG. 2 illustrates a diagram of an embodiment wireless network adapted to transport wireless transmissions spanning portions of both the primary and complementary spectrums over an adaptable air interface.

As discussed in U.S. patent application Ser. No. 14/669,333, a unified air interface that supports wireless transmissions spanning portions of both the primary and complementary spectrums can be established between a transmit point and a receive point. FIG. 2 illustrates an embodiment wireless network 200 adapted for communicating wireless transmissions spanning portions of both the primary and complementary spectrums. As shown, the wireless network 200 comprises a transmit point 210, a receive point 230, and a scheduler 270. The transmit point 210 may be any device adapted to emit a wireless transmission, and the receive point 230 may be any device adapted to receive the wireless signal transmitted by the transmit point 210. For example, the transmit point 210 may be a base station, a relay station, or a mobile station. Likewise, receive point 230 may also be a base station, a relay station, or a mobile station.

A unified air interface 213 is established between the transmit point 210 and the receive point 230, and is adapted to carry a wireless transmission 290 that spans at least a portion of the primary band and a portion of the complementary band. The wireless transmission 290 may be any type of wireless signal. For example, the wireless transmission 290 may be a downlink signal, an uplink signal, a device-to-device signal, a signal communicated over a wireless backhaul link (e.g., between neighboring base stations, etc.), or any other wireless signal communicated between a transmit point and a receive point. The wireless transmission 290 may also have different transmission formats/characteristics. For example, the wireless transmission 290 may be a unicast transmission, a multi-cast transmission, or a broadcast transmission. As another example, the wireless transmission may include single-layer signaling and/or multi-layer signaling communicated from a single antenna or from multiple antennas, e.g., single-user (SU) multiple input multiple output (MIMO) transmissions, multi-user MIMO transmissions, etc.

The scheduler 270 may be a control plane entity adapted to schedule traffic over the unified air interface 213. In some embodiments, the scheduler 270 is an integrated component on the transmit point 210. For instance, the transmit point 210 may be a base station, and the scheduler 270 may be an on-board component of the base station adapted to schedule downlink transmissions. In other embodiments, the scheduler 270 is an integrated component on the receive point 230. For instance, the receive point 230 may be a base station, and the scheduler 270 may be an on-board component of the base station adapted to schedule uplink transmissions from the transmit point 210. In yet other embodiments, the scheduler 270 is independent from the transmit point 210 and the receive point 210. As one example, the scheduler 270 may be a centralized controller adapted to perform scheduling for a cluster of base stations. As another example, the transmit point 210 and/or the receive point 230 may be a low power node, and the scheduler 270 may be an on-board component of a macro-base station adapted to perform scheduling for the low power node. As yet another example, the transmit point 210 and the receive point 230 may be mobile devices or machines, and the scheduler 270 may be an on-board component of a base station adapted to perform scheduling for device-to-device (D2D) or machine-to-machine (M2M) transmissions between the transmit point 210 and the receive point 230. Other implementations are also possible.

The transmitter 210 dynamically varies the rate at which portions of a traffic flow are transmitted over the primary band and/or the complementary band in order to maintain the overall transmission rate above a minimum threshold. In one embodiment, the rates are varied when a switching criteria is satisfied. For example, the switching criteria may be satisfied when a level of contention on the complementary band exceeds an upper threshold or falls below a lower threshold. In another example, the switching criteria may be satisfied when a number of available scheduled resources in the primary band exceeds an upper threshold or falls below a lower threshold. The transmitter 210 dynamically vary the rate at which portions of a traffic flow are transmitted over the primary band and/or the complementary band in order to maintain a quality of service (QoS) performance metric of the traffic flow above a threshold. For example, the switching criteria may be satisfied when a measured latency metric (or packet delay) of the traffic flow exceeds an upper threshold or falls below a lower threshold. As another example, the switching criteria may be satisfied when a measured packet-drop rate of the traffic flow exceeds an upper threshold or falls below a lower threshold. As yet another example, the switching criteria may be satisfied when a measured jitter metric of the traffic flow exceeds an upper threshold or falls below a lower threshold. Other QoS parameters may also be included in the switching criteria.

The transmitter 210 may multiplex traffic having statistical QoS constraints over the complementary band and the primary band. As referred to herein, a "statistical QoS constraint" is a QoS constraint that can be satisfied even when some packets (e.g., a fraction of the total packets) are communicated in a manner that violates a QoS requirement. For example, if a traffic flow has a statistical latency requirement, then the service agreement may be satisfied so long as a certain percentage of the packets are communicated within a delay bound. Statistical QoS constraints may differ from "deterministic QoS constraints," which require that every packet in a traffic flow is communicated in a manner that satisfies a QoS requirement.

In some embodiments, the complementary band may be used to transport the traffic to the extent that the complementary band is capable of satisfying the statistical QoS constraint, with additional traffic being offloaded to the primary band. For example, the transmitter 210 may monitor a quality of service (QoS) performance metric of a traffic flow transmission to determine whether the statistical QoS constraint is being satisfied, or is on pace to be satisfied. If the QoS performance metric falls below a lower threshold (e.g., too few packets are meeting the QoS requirement to satisfy the statistical QoS constraint), then the transmitter 210 may switch a portion (or all) of the traffic flow from the complementary band to the primary band. Conversely, if the QoS performance metric rises above an upper threshold (e.g., substantially more packets are meeting the QoS requirement than are needed to satisfy the statistical QoS constraint), then the transmitter 210 may switch a portion (or all) of the traffic flow from the primary band to the complementary band.

Figure 3:
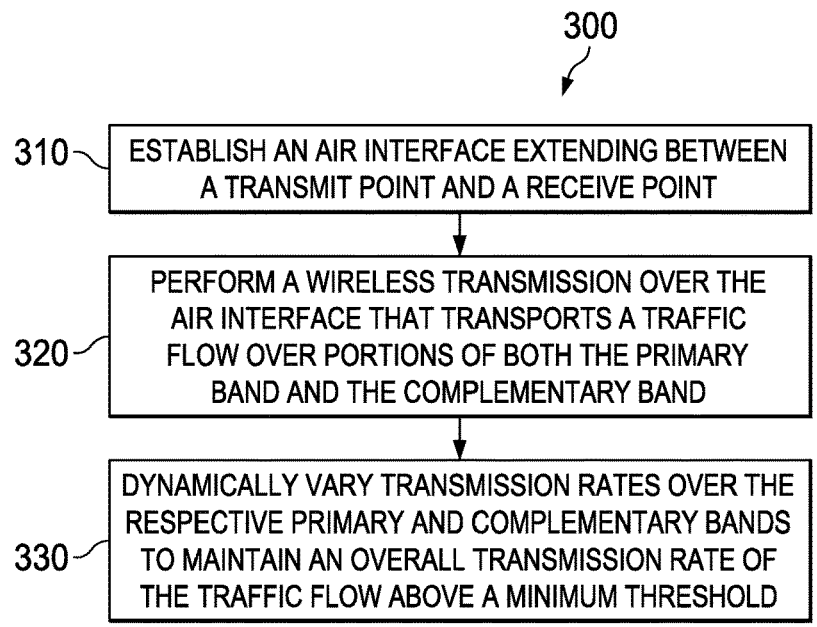
FIG. 3 illustrates a flowchart of an embodiment method for dynamically varying transmission rates over primary and complementary bands.

Aspects of this disclosure provide methods for dynamically switching traffic from the primary band to the complementary band when a switching criteria is satisfied. FIG. 3 illustrates a method 300 for dynamically for dynamically varying transmission rates over primary and complementary bands, as might be performed by a transmit point. As shown, the method 300 begins at step 310, where the transmit point establishes a unified air interface with a receive point. Next, the method 300 proceeds to step 320, where the transmit point performs a wireless transmission over the unified air interface that transports a traffic flow over portions of the primary band and the complementary band. Thereafter, the method 300 proceeds to step 330, where the transmit point dynamically varies transmission rates of the traffic flow over the respective primary and complementary bands in order to maintain an overall transmission rate of the traffic flow above a minimum threshold. In some embodiments, a scheduler may prompt the transmit point to perform one or more of these steps.

Aspects of this disclosure also provide methods for dynamically varying the amount of spectrum spanned by wireless transmission in the complementary band, the primary band, or both when a switching criteria is satisfied. More specifically, a transmit point may multiplex data carried by a wireless transmission over the primary and complementary band. The transmit point may then dynamically adjust (e.g., widen or narrow) the amount of spanned spectrum in one or both of the bands when a criteria is satisfied. The transmit point may adjust the spectrum spanned in both bands simultaneously. Conversely, the transmit point may adjust the spectrum spanned in one band without adjusting the spectrum spanned in the other band.

In some embodiments, widening/narrowing of the spectrum over one band but not the other allows the transmit point to adjust the overall transmission rate without changing the transmission characteristics on the non-adjusted band. For example, the transmit point may widen/narrow the amount of spectrum spanned in the primary band without altering transmission characteristics of the complementary band. This may allow the transmit point to increase or decrease a transmission rate over the primary band without affecting activity on the complementary band, e.g., without increasing a contention rate over the complementary band, etc. Likewise, the transmit point may widen/narrow the amount of spectrum spanned in the complementary band without altering transmission characteristics of the primary band. This may allow the transmit point to increase or decrease a transmission rate over the complementary band without affecting activity on the primary band, e.g., without re-allocating resources to/from other users, etc.

Figure 4:
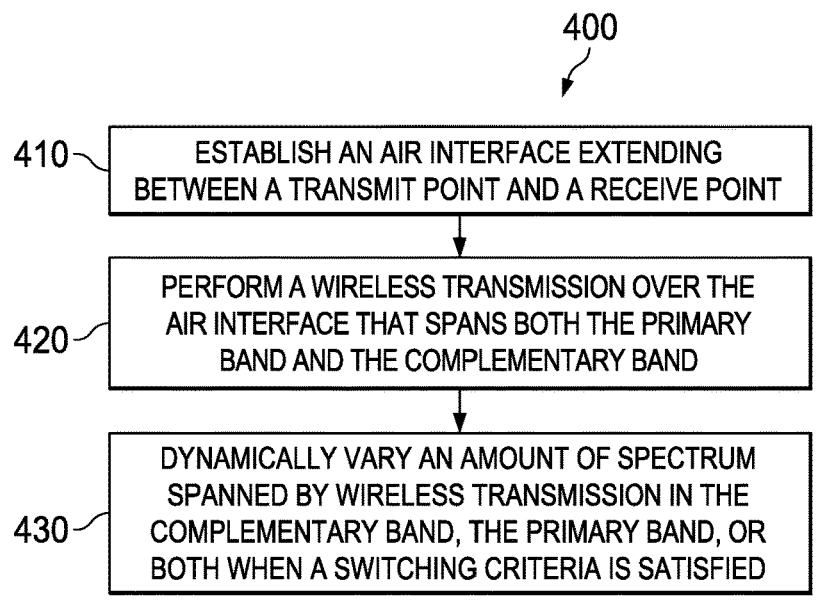
FIG. 4 illustrates a flowchart of an embodiment method for dynamically varying the amount of spectrum spanned by wireless transmission in the complementary band.

FIG. 4 illustrates a method 400 for dynamically varying the amount of spectrum spanned by wireless transmission in the complementary band, the primary band, or both. As shown, the method 400 begins at step 410, where the transmit point establishes a unified air interface with a receive point. Next, the method 400 proceeds to step 420, where the transmit point performs a wireless transmission over the unified air interface that spans both the primary band and the complementary band. Thereafter, the method 400 proceeds to step 430, where the transmit point dynamically varies an amount of spectrum spanned by wireless transmission in the complementary band, the primary band, or both when a switching criteria is satisfied.

In other embodiments, widening/narrowing of the spectrum over one band but not the other allows the transmit point to adjust a coding rate over the adjusted band without changing a transmission rate over the adjusted band, as well as without affecting activity on the non-adjusted band. Varying the coding rate in this manner may enable the transmit point to manipulate the ratio of parity information to information bits being communicated over the adjusted band, thereby effectively allowing the transmit point to manipulate the traffic flow's QoS metrics without affecting activity on the non-adjusted band. For example, the transmit point may improve packet loss rates over the primary or complementary band by widening the spectrum, and increasing the coding rate, over the corresponding band. As another example, the transmit point may improve the spectral efficiency over the primary or complementary band by narrowing the spectrum, and reducing the coding rate, over the corresponding band.

Figure 5:
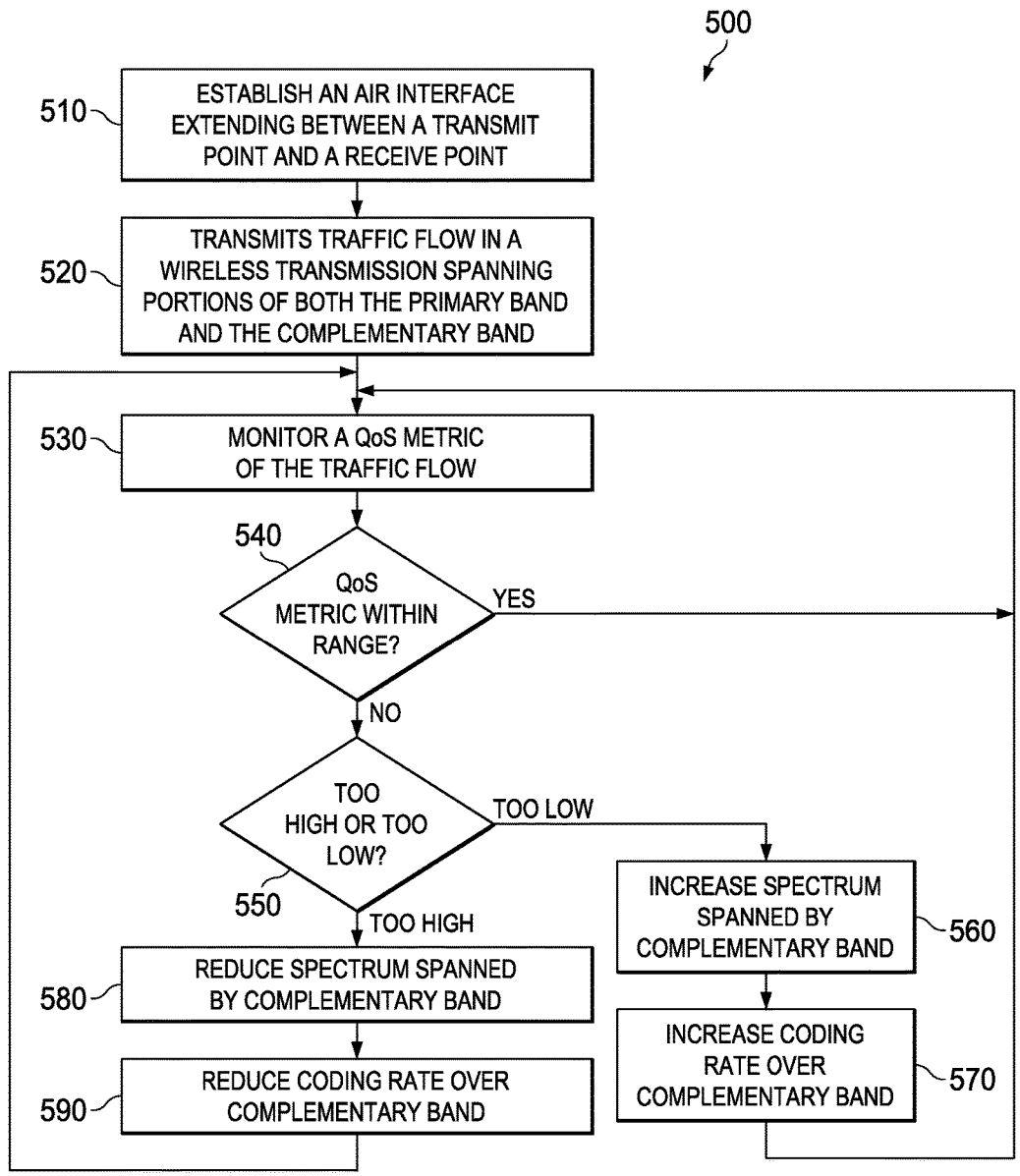
FIG. 5 illustrates a flowchart of another embodiment method for dynamically adjusting the QoS metric by varying adjusting the spanned spectrum and coding rate over the complementary band.

FIG. 5 illustrates a method 500 for dynamically adjusting the QoS metric by varying the spanned spectrum and coding rate over the complementary band. As shown, the method 500 begins at step 510, where the transmit point establishes a unified air interface with a receive point. Next, the method 500 proceeds to step 520, where the transmit point transmits a traffic flow in a wireless transmission spanning portions of both the primary band and the complementary band.

Subsequently, the method 500 proceeds to steps 530-540, where the transmit point monitors a QoS metric of the traffic flow, and determines whether the QoS metric is within an acceptable range. The acceptable range may depend on a statistical QoS constraint of the traffic flow. If the QoS metric is within the acceptable range, the method 500 reverts back to steps 530-540, which are repeated until the QoS metric falls outside the acceptable range or transmission of the traffic flow is completed.

If the QoS metric is outside the acceptable range, the method 500 proceeds to step 550, where the transmit point determines whether the QoS metric is too low or too high. The QoS metric may be too low when a smaller proportion of packets are meeting the QoS requirement than are required to satisfy the statistical QoS requirement. The QoS metric may be too high when a significantly larger proportion of packets are meeting the QoS requirement than are required to satisfy the statistical QoS requirement, e.g., the traffic flow transmission is outpacing the statistical QoS requirement.

If the QoS metric is too low, then the method 500 proceeds to steps 560-570, where the transmit point increases both the amount of spectrum spanned by the complementary band and the coding rate over the complementary band. Conversely, if the QoS metric is too high, then the method 500 proceeds to steps 580-590, where the transmit point reduces both the amount of spectrum spanned by the complementary band and the coding rate over the complementary band. Thereafter, the method 500 reverts back to steps 530-540, which are repeated until the QoS metric falls outside the acceptable range or transmission of the traffic flow is completed. A similar procedure could be used to adjust the spectrum and/or coding rate over the primary band. In some embodiments, the coding rate and transmission rate can be varied after adjusting the spectrum spanned by in one or both of the bands.

Figure 6:
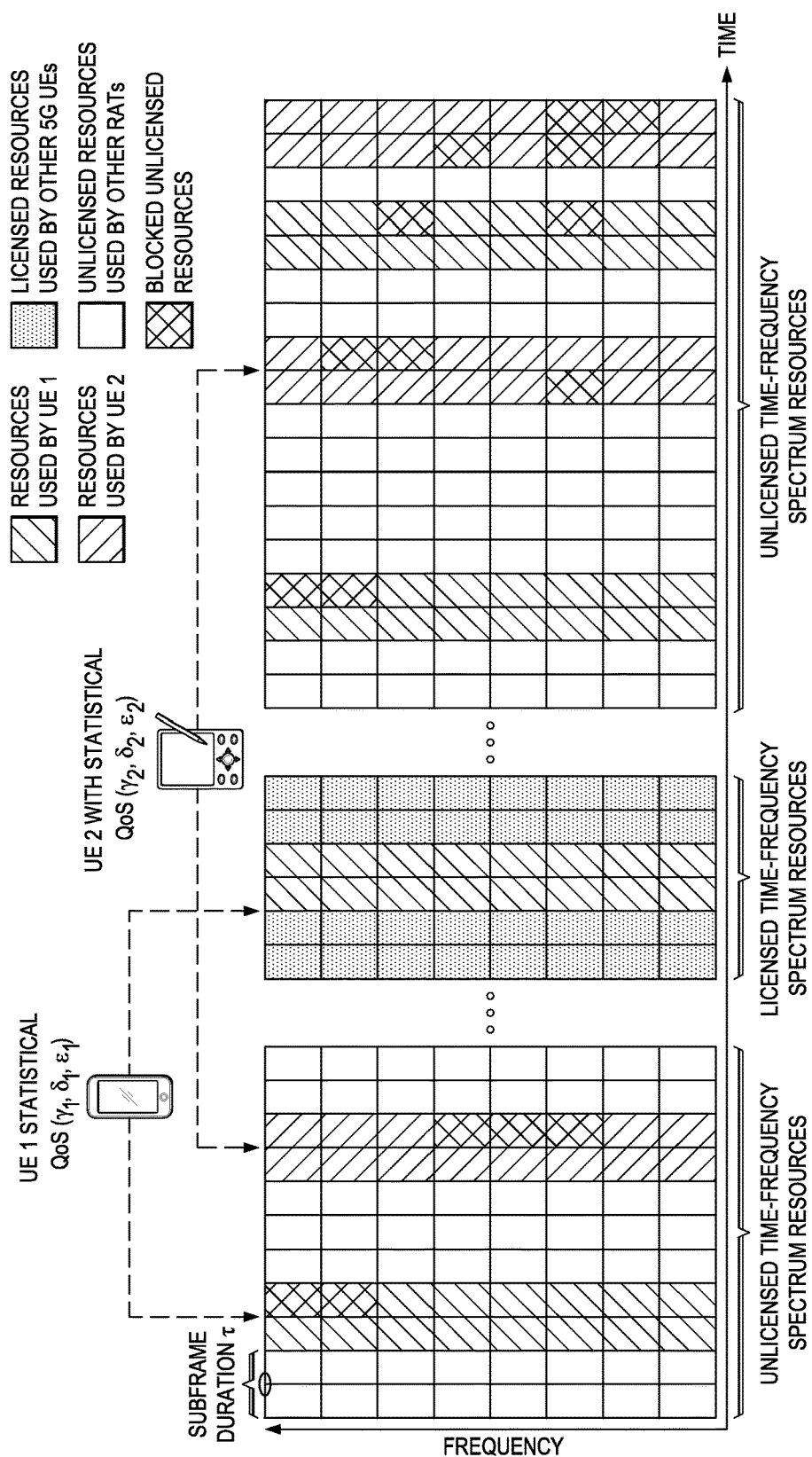
FIG. 6 illustrates a diagram of an embodiment network architecture adapted to provide QoS-driven integrated spectrum access.

In some embodiments, traffic flows may be multiplexed over the primary and complementary bands. In such embodiments, different proportions of traffic may be allocated to the respective primary and complementary bands based on a QoS constraint of the traffic. FIG. 6 illustrates an embodiment network architecture adapted to provide QoS-driven integrated spectrum access. In this example, a first UE (UE1) has a first set of statistical QoS constraints ($\gamma_1, \delta_1, \varepsilon_1$), while a second UE (UE2) has a second set of statistical QoS constraints ($\gamma_2, \delta_2, \varepsilon_2$) that is different that the first set of statistical QoS constraints. As shown, traffic associated with the first UE is multiplexed over both the primary and complementary spectrums, while traffic associated with the second UE is communicated exclusively over the complementary spectrum. The blocked unlicensed resources may be indicate a collision between transmissions of the first UE or the second UE and other devices attempting to access grant-less resources of the complementary band.

In some embodiments, wireless networks may create pools of spectrum (licensed and unlicensed), and route traffic through the pools in accordance with the capacity and reliability of the network. The traffic in the licensed and unlicensed pools can be sent using different waveforms selected in accordance with the characteristics of the frequency bands and the projected traffic in each band.

The routing may be done with the recognition that the unlicensed spectrum may be less reliable than the licensed spectrum, e.g., due to the presence of other users and/or interference caused by appliances such as microwave ovens.

Aspects of this disclosure provide systems and methods for performing wireless transmission spanning both licensed and unlicensed spectrum bands via a unified air interface (AI), such as a next generation or 5th generation air interface. Aspects of this disclosure may increase the overall system capacity, while also satisfying application-specific quality of service (QoS) requirements. Aspects of this disclosure extend wireless networks into unlicensed spectrum to improve network capacity. Aspects of this disclosure provide dynamic switching techniques between licensed and unlicensed spectrum; flexible cross-spectrum load balancing; minimized interference over licensed spectrum; and a reduction in demands for licensed spectrum. The licensed spectrum, also referred to as the primary band and/or core band/spectrum, may be used for high priority traffic and traffic with deterministic QoS requirements. It may serve as fallback spectrum (e.g., on an as needed basis) for traffic having statistical QoS requirements. The unlicensed spectrum, also referred to as the primary band and/or core band/spectrum, may be used for traffic offloading, and in some embodiments may be used for best-effort traffic and traffic with statistical QoS requirements.

Figure 7:
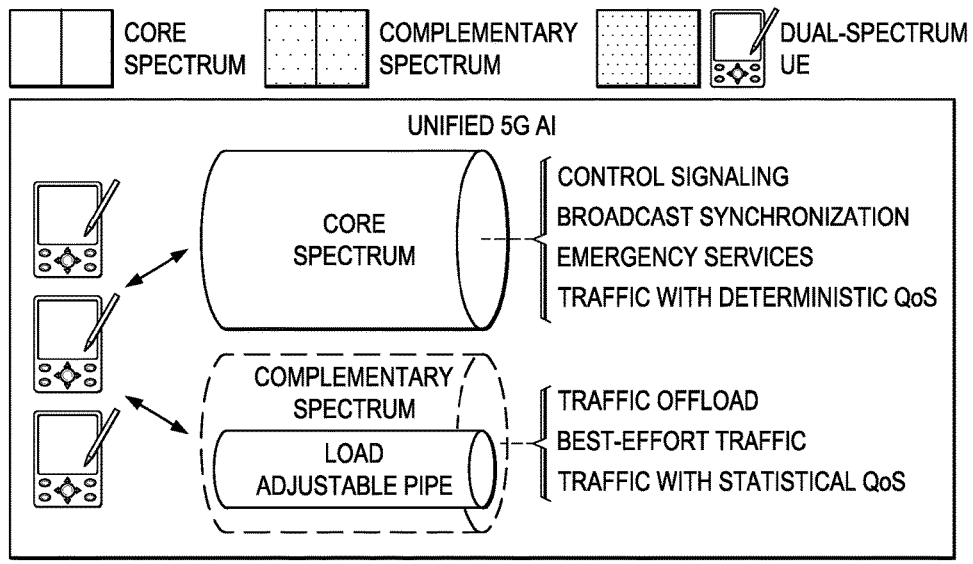
FIG. 7 illustrates a diagram of an embodiment unified air interface for supporting wireless transmissions spanning both the primary and complementary bands.

FIG. 7 illustrates an embodiment unified air interface for supporting wireless transmissions spanning both the primary and complementary bands. The primary band may be used for higher priority traffic, such as control signaling, emergency services, security, network access, broadcasts, synchronization channels, and traffic with deterministic QoS requirements. The unlicensed spectrum can be used opportunistically for traffic offloading purposes, and for best-effort (delay-tolerant) traffic (e.g. content download such as movies, pictures and music), as well as traffic with statistical QoS requirements. Network elements can dynamically switch traffic between the primary and complementary band to satisfy traffic-type and/or application-specific QoS requirements. This provides for a load-aware spectrum expansion/retraction.

In an embodiment, the complementary spectrum is used for a variety of tasks such as data offloading traffic from the primary band, and for load-aware demand-based adaptive spectrum expansion-retraction. It should be noted that because different spectrum bands are being used, different Air Interfaces (AIs) can be used for the primary and complementary bands. Alternatively, the same air interface can be used to carry transmissions spanning both the primary and complementary bands. In an embodiment, a spectrum type dependent SoftAI provides different transmission parameters (e.g., physical layer (PHY) designs) for the primary band and complementary band. This may allow for different waveforms, different access schemes, frame structure, channelization, etc. A virtual resource association (V-RA) based joint radio resource management (RRM) scheme can be employed to determine the demand for unlicensed spectrum considering transmit point (TP) cooperation and UE cooperation. A key performance indicator (KPI) monitoring mechanism for licensed spectrum fall back operation can be added to ensure QoS requirements are met.

Figure 8:
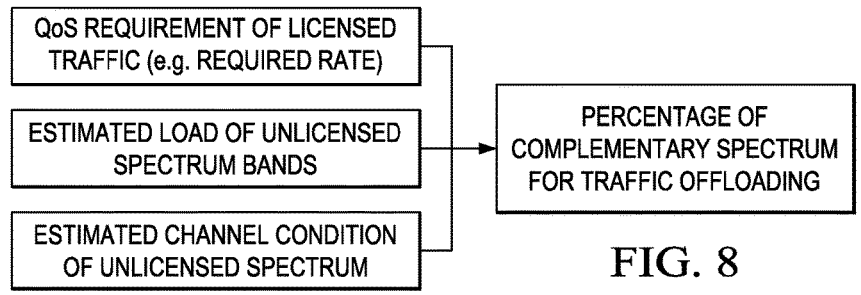
FIG. 8 illustrates a block diagram of an embodiment algorithm for determining a percentage of an extended spectrum over which to offload traffic.

FIG. 8 illustrates a block diagram of an embodiment algorithm for determining a percentage of an extended spectrum over which to offload traffic. The percentage of complementary band used for licensed traffic offloading can be flexibly and dynamically adjusted for the sake of fairness, e.g., in order to reduce the impact on other co-existing systems based on factors such as average traffic load in the unlicensed bands, channel conditions in the licensed and unlicensed spectrum, and licensed traffic QoS requirements such as minimum rate, delay sensitivity, priority, and others.

Spectrum sensing can be used to identify unused portions of the unlicensed spectrum to be opportunistically used for traffic offloading. OFDM is the most commonly used multicarrier waveform, but it is known to suffer from high out-of-band side lobes of its power spectral density. This may cause adjacent channel interference problems for co-existing systems and require the usage of guard bands. Alternatively, dynamic access to the complementary band may require the use of more spectrally contained and scalable baseband waveforms.

Filtering can be used to reduce the out-of-band emissions of OFDM. Filtered-OFDM (F-OFDM) with adaptive filters dynamically designed for specific frequency fragments can be a more spectrally efficient and scalable waveform for dynamically accessing non-contiguous fragments of the unlicensed spectrum.

OFDM/OQAM is a filter bank multi-carrier (FBMC) waveform which is more spectrally contained than OFDM waveform (no need for guard band or cyclic prefix) and also offers more flexibility in dynamic spectrum sharing environments such as the unlicensed spectrum and may offer better performance than F-OFDM at the cost of more complexity and higher latency.

Figure 9:
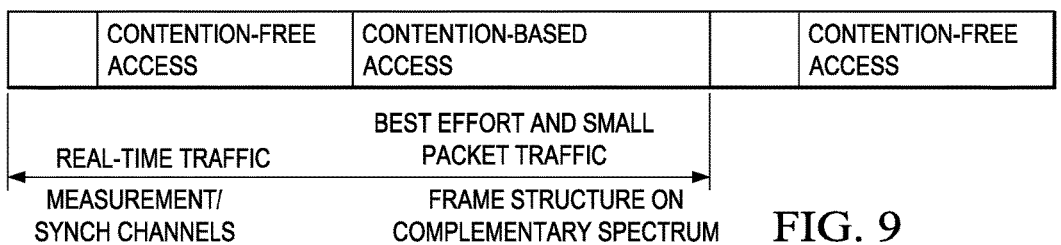
FIG. 9 illustrates a diagram of an embodiment frame structure.

Aspects of this disclosure provide a spectrum-type dependent multicarrier system that combines the use of a proven multicarrier waveform such as OFDM in the primary band and/or a waveform that is more suitable for dynamic spectrum sharing environments such as F-OFDM or FBMC waveforms in the complementary band Spectrum access in the extended unlicensed spectrum may be required to abide by some regulations in certain regions such as listen-before-talk (LBT) regulations. An adaptive and flexible frame structure in the complementary band can accommodate regulatory restrictions such as LBT mechanism as well as allow for transmission of measurement and synchronization channels. In one embodiment the frame structure in the unlicensed spectrum where the time duration for contention-free and contention-based access can be adjusted according to periodic channel sensing results as shown in FIG. 9.

Scheduled grant-based access may be used on the primary band, while contention-based access may be used on the complementary band. Using contention based access on the complementary band may allow the spectrum to be shared with co-existing systems. In an embodiment, two contention-levels can be defined. The first is an inter-Radio Access Technology (RAT) contention, while the second is an Intra-RAT contention. In an Inter-RAT contention is between different radio access technologies using the complementary band (e.g. between 5G RAT and other RATs). In an Intra-RAT contention, contention is between similar technology entities (e.g. 5G network entities with best-effort traffic).

In an embodiment, a specially designed MAC protocol is used to efficiently use the complementary band and properly handle the two levels of contention on the complementary band. This can allow for some form of LBT random access procedure, a central entity may decide whether 5G RAT should use the complementary band based on the average traffic load on the unlicensed spectrum. When the unlicensed band is sensed to be lightly loaded, the central entity may adaptively increase the probability for 5G RAT to access the unlicensed spectrum and vice versa. Such a central entity can use either scheduled or contention-based access for managing intra-RAT contention.

The centralized controller can be used to select which spectrum is to be used by which UEs depending on application scenario, traffic type, QoS and security requirements. Alternatively, rules and conditions could be pushed to the UE to allow for the UE to participate in the decision process.

In one exemplary scenario, a high QoS data such as voice, operator-specific services or high security data bearers can be transmitted over licensed spectrum to ensure the QoS requirements are met. Meanwhile, Elastic traffic e.g. best effort and delay tolerant data bearers can be transferred over the unlicensed (and less reliable) spectrum. The centralized controller can continuously or periodically measure the QoS being offered over the unlicensed band and dynamically switch UEs and traffic back to licensed spectrum whenever the expected QoS cannot be guaranteed. A fall-back mechanism can be employed to ensure that whenever QoS requirements cannot be met over the unlicensed spectrum, a fall back to the licensed spectrum takes place.

Assume $UE_i$ has periodic traffic with QoS characteristics that are captured by three parameters ($\gamma_i$, $\delta_i$, $\varepsilon_i$), where $\gamma$ is a Packet arrival rate, $\delta$ is a Maximum tolerable jitter (difference between the times of 2 successive packet departures and the time of 2 successive packet arrivals) and $\varepsilon$ is an Acceptable probability of jitter violation.

For UEs with deterministic QoS guarantees, $\varepsilon_i$ equals zero. Since there is no margin for jitter violation in this case, then the centralized controller assigns UEs with deterministic QoS to use the licensed spectrum. In order to achieve efficient usage of spectrum resources, the centralized controller may assign unlicensed spectrum resources for UEs with statistical QoS requirements. Unlicensed spectrum may be unreliable, so its resources are characterized by a certain blocking rate q. The centralized controller can monitor the average blocking rate over the unlicensed spectrum and may be based on these characteristics assign the UEs with statistical QoS to use the unlicensed spectrum as long as QoS is within acceptable levels e.g. $q<\varepsilon_i$.

Those skilled in the art will appreciate that existing solutions do not provide a solution that allows for integrated spectrum access method that efficiently utilizes both licensed and unlicensed spectrum bands using a unified air interface while at the same time maximizing the overall system capacity and ensuring QoS constraints for diverse traffic types (e.g., elastic versus inelastic traffic) are met. The above discussed solution can take advantage of application-specific QoS characteristics to efficiently utilize both licensed and unlicensed spectrum in order to enhance the performance of 5G radio access networks.

Figure 10:
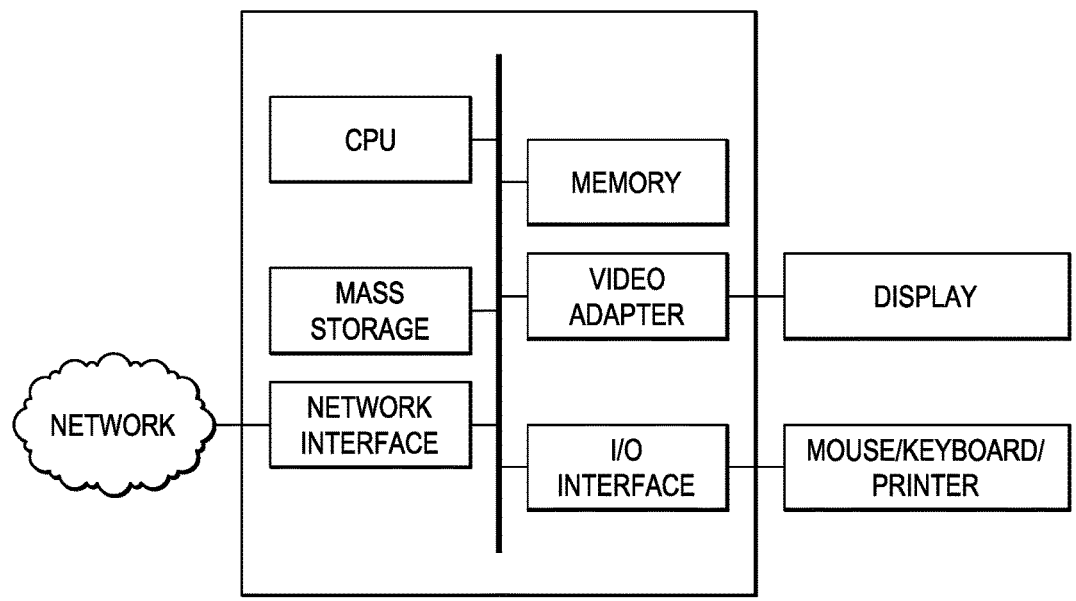
FIG. 10 illustrates a diagram of an embodiment computing platform.

FIG. 10 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 11:
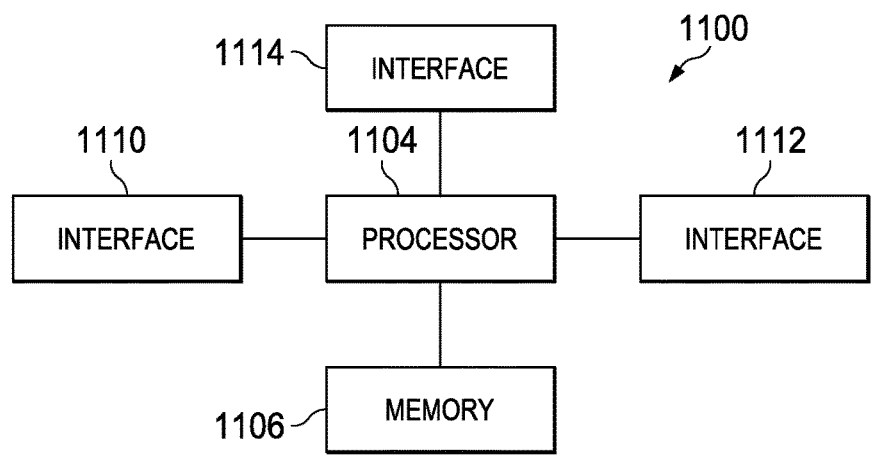
FIG. 11 illustrates a diagram of an embodiment communications device.

FIG. 11 illustrates a block diagram of an embodiment of a communications device 1100, which may be equivalent to one or more devices (e.g., UEs, NBs, etc.) discussed above. The communications device 1100 may include a processor 1104, a memory 1106, and a plurality of interfaces 1110, 1112, 1114, which may (or may not) be arranged as shown in FIG. 11. The processor 1104 may be any component capable of performing computations and/or other processing related tasks, and the memory 1106 may be any component capable of storing programming and/or instructions for the processor 1104. The interfaces 1110, 1112, 1114 may be any component or collection of components that allows the communications device 1100 to communicate using a cellular signal, and may be used to receive and/or transmit information over a cellular connection of a cellular network.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for facilitating signal transmissions spanning licensed and unlicensed bands, the method comprising:
   identifying, by a scheduler, a traffic flow being transmitted over a unified air interface operating in accordance with a common radio access technology (RAT), wherein a first portion of the traffic flow is transmitted over a primary band of the unified air interface licensed for cellular communication and a second portion of the traffic flow is transmitted over a complementary band of the unified air interface reserved for unlicensed communication, the unified air interface providing a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
   prompting a transmit point to dynamically vary a first rate in which the first portion of the traffic flow is transmitted over the primary band of the unified air interface in accordance with a first set of configuration parameters and dynamically vary a second rate in which the second portion of the traffic flow is transmitted over the complementary band of the unified air interface in accordance with a second set of configuration parameters different from the first set of configuration parameters such that an overall quality of service (QoS) requirement of the traffic flow over the unified air interface is satisfied.

2. The method of claim 1, wherein the prompting comprises:
   prompting the transmit point to dynamically vary the first and second rates in which the first portion and the second portion of the traffic flow are transmitted over the primary band of the unified air interface and the complementary band of the unified air interface, respectively, such that a cumulative transmission rate of the traffic flow over the primary band and the complementary band of the unified air interface is maintained above a minimum threshold.

3. The method of claim 2, wherein the prompting comprises:
   allocating additional scheduled resources of the primary band to the traffic flow when an effective transmission rate over the complementary band falls below a lower threshold.

4. The method of claim 2, wherein the prompting comprises:
   allocating fewer scheduled resources of the primary band to the traffic flow when a transmission rate over the complementary band exceeds an upper threshold.

5. The method of claim 2, wherein the prompting comprises:
   prompting the transmit point to vary the first rate in which the first portion of the traffic flow is transmitted over the primary band; and
   prompting the transmit point to vary the second rate in which the second portion of the traffic flow is transmitted over the complementary band, where the second rate is varied by an amount that is inversely proportional to that in which the first rate is varied.

6. The method of claim 2, wherein the prompting comprises:
   prompting the transmit point to dynamically switch the first portion of the traffic flow from the primary band to the complementary band, or to switch the second portion of the traffic flow from the complementary band to the primary band, when a switching criteria is satisfied.

7. The method of claim 6, wherein the switching criteria is satisfied when a level of contention over grant-less resources of the complementary band exceeds an upper threshold or falls below a lower threshold.

8. The method of claim 6, wherein the switching criteria is satisfied when an availability of scheduled resources in the primary band exceeds an upper threshold or falls below a lower threshold.

9. The method of claim 1, wherein the prompting comprises:
   prompting the transmit point to dynamically vary the first rate and dynamically vary the second rate during data transmission when a threshold is satisfied.

10. The method of claim 1, the traffic flow being transmitted over the unified air interface operating in accordance with the common RAT of a transceiver of the transmit point.

11. A scheduler comprising:
    a processor; and
    a non-transitory computer readable storage medium storing programming for execution by the processor, the programming including instructions to:
    identify a traffic flow being transmitted over a unified air interface operating in accordance with a common radio access technology (RAT), wherein a first portion of the traffic flow is transmitted over a primary band of the unified air interface licensed for cellular communication and a second portion of the traffic flow is transmitted over a complementary band of the unified air interface reserved for unlicensed communication, the unified air interface providing a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
    prompt a transmit point to dynamically vary a first rate in which the first portion of the traffic flow is transmitted over the primary band of the unified air interface in accordance with a first set of configuration parameters and dynamically vary a second rate in which the second portion of the traffic flow is transmitted over the complementary band of the unified air interface in accordance with a second set of configuration parameters different from the first set of configuration parameters such that an overall quality of service (QoS) requirement of the traffic flow over the unified air interface is satisfied.

12. A method for transmitting a signal spanning licensed and unlicensed bands, the method comprising:
    establishing a unified air interface between a transmit point and one or more receive points, the unified air interface operating in accordance with a common radio access technology (RAT);
    transmitting, by the transmit point, a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
    dynamically varying a first rate in which the first portion of the traffic flow is transmitted over the primary band of the unified air interface in accordance with a first set of configuration parameters and dynamically vary a second rate in which the second portion of the traffic flow is transmitted over the complementary band of the unified air interface in accordance with a second set of configuration parameters different from the first set of configuration parameters such that an overall quality of service (QoS) requirement of the traffic flow over the unified air interface is satisfied.

13. The method of claim 12, wherein the dynamically varying comprises:
    dynamically varying the first and second rates in which the first portion and the second portion of the traffic flow are transmitted over the primary band of the unified air interface and the complementary band of the unified air interface, respectively, such that a cumulative transmission rate of the traffic flow over the primary band of the unified air interface and the complementary band of the unified air interface is maintained above a minimum threshold.

14. The method of claim 13, wherein the dynamically varying comprises:
    allocating, or requesting the allocation of, additional scheduled resources on the primary band when an effective transmission rate over the complementary band falls below a lower threshold.

15. The method of claim 13, wherein the dynamically varying comprises:
    allocating, or requesting the allocation of, additional scheduled resources on the primary band when an effective transmission rate over the complementary band exceeds an upper threshold.

16. The method of claim 13, wherein the dynamically varying comprises:
    varying the first rate of the first portion of the traffic flow over the primary band; and
    varying the second rate of the second portion of the traffic flow over the complementary band, where the second rate is varied by an amount that is inversely proportional to that of the first rate.

17. The method of claim 13, wherein the dynamically varying comprises:
    dynamically switching a portion of the traffic flow from the primary band to the complementary band, or vice versa, when a switching criteria is satisfied.

18. The method of claim 17, wherein the switching criteria is satisfied when a level of contention over grant-less resources of the complementary band exceeds an upper threshold or falls below a lower threshold.

19. The method of claim 17, wherein the switching criteria is satisfied when an availability of scheduled resources in the primary band exceeds an upper threshold or falls below a lower threshold.

20. The method of claim 17, wherein the switching criteria comprises software defined radio (SDR) signaling instructions received from a controller.

21. The method of claim 12, wherein the transmit point comprises a user equipment (UE) or a base station (BS).

22. A transmit point comprising:
    a processor; and
    a non-transitory computer readable storage medium storing programming for execution by the processor, the programming including instructions to:
        establish a unified air interface with one or more receive points, the unified air interface operating in accordance with a common radio access technology (RAT);
        transmit a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
        dynamically vary a first rate in which the first portion of the traffic flow is transmitted over the primary band of the unified air interface in accordance with a first set of configuration parameters and dynamically vary a second rate in which the second portion of the traffic flow is transmitted over the complementary band of the unified air interface in accordance with a second set of configuration parameters different from the first set of configuration parameters such that an overall quality of service (QoS) requirement of the traffic flow over the unified air interface is satisfied.

23. A method for dynamically adapting a signal spanning licensed and unlicensed bands, the method comprising:
    establishing a unified air interface between a transmit point and one or more receive points, the unified air interface operating in accordance with a common radio access technology (RAT);
    transmitting a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and in accordance with a first set of configuration parameters and the second portion of the traffic flow transmitted over the complementary band of the unified air interface operating in accordance with the common RAT and in accordance with a second set of configuration parameters different from the first set of configuration parameters; and dynamically varying a rate in which the first portion of the traffic flow is transmitted over the primary band in accordance with a channel condition of the complementary band.

24. The method of claim 23, wherein the channel condition on the complementary band comprises a channel load on the complementary band.

25. The method of claim 23, wherein the channel condition on the complementary band comprises at least one of a latency, a throughput, and a packet loss level on the complementary band.

26. The method of claim 23, wherein the transmit point comprises a user equipment (UE) or a base station (BS).

27. A transmit point comprising:
a processor; and
a non-transitory computer readable storage medium storing programming for execution by the processor, the programming including instructions to:
establish a unified air interface between the transmit point and one or more receive points, the unified air interface operating in accordance with a common radio access technology (RAT);
transmit a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and in accordance with a first set of configuration parameters and the second portion of the traffic flow transmitted over the complementary band of the unified air interface operating in accordance with the common RAT and in accordance with a second set of configuration parameters different from the first set of configuration parameters; and
dynamically vary a rate in which the first portion of the traffic flow is transmitted over the primary band in accordance with a channel condition of the complementary band.

28. A method for dynamically adapting a signal spanning licensed and unlicensed bands, the method comprising:
establishing a unified air interface between a transmit point and one or more receive points, the unified air interface operating in accordance with a common radio access technology (RAT);
transmitting a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
dynamically varying a rate in which the second portion of the traffic flow is transmitted over the complementary band in accordance with a channel condition of the primary band.

29. The method of claim 28, wherein the channel condition on the primary band comprises a channel load on the primary band.

30. The method of claim 28, wherein the channel condition on the primary band comprises a latency on the primary band.

31. The method of claim 28, wherein the channel condition on the primary band comprises a throughput on the primary band.

32. The method of claim 28, wherein the channel condition on the primary band comprises a packet loss level on the primary band.

33. A transmit point comprising:
a processor; and
a non-transitory computer readable storage medium storing programming for execution by the processor, the programming including instructions to:
establish a unified air interface between the transmit point and one or more receive points, the unified air interface operating in accordance with a common radio access technology (RAT);
transmit a first portion of a traffic flow over a primary band of the unified air interface and a second portion of the traffic flow over a complementary band of the unified air interface, the primary band of the unified air interface being licensed for cellular communication and the complementary band of the unified air interface being reserved for unlicensed communication, wherein the unified air interface provides a common physical and medium access control (MAC) connection that is shared by both the first portion of the traffic flow transmitted over the primary band of the unified air interface operating in accordance with the common RAT and the second portion of the traffic flow transmitted over the complementary band of the unified air interface operating in accordance with the common RAT; and
dynamically vary a rate in which the second portion of the traffic flow is transmitted over the complementary band in accordance with a channel condition of the primary band.

34. The transmit point of claim 33, wherein the channel condition on the primary band comprises a channel load on the primary band.

35. The transmit point of claim 33, wherein the channel condition on the primary band comprises at least one of a latency or a throughput on the primary band.

36. The transmit point of claim 33, wherein the channel condition on the primary band comprises a packet loss level on the primary band.

\* \* \* \* \*